US010559892B2

(12) United States Patent
Kuiper

(10) Patent No.: US 10,559,892 B2
(45) Date of Patent: Feb. 11, 2020

(54) METHODS, SYSTEMS AND DEVICES FOR MONITORING MOVEMENT OF ROCK IN A MINE

(71) Applicant: MINDSPARK TECHNOLOGIES PTY LTD, Brendale, Queensland (AU)

(72) Inventor: Pieter Kuiper, Brendale (AU)

(73) Assignee: MINDSPARK TECHNOLOGIES PTY LTD, Brendale, Queensland (AU)

( * ) Notice: Subject to any disclaimer, the term of this patent is extended or adjusted under 35 U.S.C. 154(b) by 0 days.

(21) Appl. No.: 16/180,488

(22) Filed: Nov. 5, 2018

(65) Prior Publication Data

US 2019/0173200 A1  Jun. 6, 2019

Related U.S. Application Data

(62) Division of application No. 14/406,485, filed as application No. PCT/AU2013/000629 on Jun. 13, 2013, now abandoned.

(30) Foreign Application Priority Data

Jun. 7, 2012  (AU) ................................ 2012902390

(51) Int. Cl.
*H01Q 21/29*  (2006.01)
*G01S 11/06*  (2006.01)
(Continued)

(52) U.S. Cl.
CPC ............. *H01Q 21/29* (2013.01); *E21C 41/30* (2013.01); *G01S 1/08* (2013.01); *G01S 11/06* (2013.01);
(Continued)

(58) Field of Classification Search
CPC . H01Q 21/29; G01S 1/08; G01S 11/06; G01S 11/02; E21C 41/30; G01V 3/00; G01V 1/008
(Continued)

(56) References Cited

U.S. PATENT DOCUMENTS 4,054,881 A    10/1977  Raab
5,963,508 A *  10/1999  Withers ................. G01V 1/008
                                                         166/250.1

(Continued)

FOREIGN PATENT DOCUMENTS

AU    2004202247 A1   12/2004
WO    2008141465 A1   11/2008
WO    2011035378 A1    3/2011

OTHER PUBLICATIONS

Li et al 'Underground Structure Monitoring With Wireless Sensor Networks', Proceedings of the 6th International Conference on Information processing in sensor networks Apr. 25, 2007 pp. 69-78.

(Continued)

*Primary Examiner* — Jeff W Natalini
(74) *Attorney, Agent, or Firm* — David D. Brush; Westman, Champlin & Koehler, P.A.

(57) ABSTRACT

A method for monitoring depth of a cave front in a cave-type mine. The method includes: providing a stationary reader device and mobile marker devices, each of the marker devices adapted to (i) emit an electromagnetic signal, (ii) detect strength of the signal emitted by another of the marker devices, and (iii) wirelessly transmit information related to the detected signal via the other marker devices to the stationary reader device; drilling a hole into a rock region of a mine, installing the mobile marker devices at sequential known depths within the hole; monitoring the reader device to detect a decrease in the strength of a signal emitted by a first marker device by a second marker device; and in
(Continued)

response to a decrease being detected by the second marker device, inferring the depth of the cave front to be between the known depths of the first and second marker devices.

8 Claims, 1 Drawing Sheet

(51) Int. Cl.
*E21C 41/30* (2006.01)
*G01V 1/00* (2006.01)
*G01S 1/08* (2006.01)
*G01V 3/00* (2006.01)
*G01S 11/02* (2010.01)

(52) U.S. Cl.
CPC .............. *G01V 1/008* (2013.01); *G01V 3/00* (2013.01); *G01S 11/02* (2013.01)

(58) Field of Classification Search
USPC ................ 340/854.1; 175/45; 405/132–153
See application file for complete search history.

(56) References Cited

U.S. PATENT DOCUMENTS

| | | | |
|---|---|---|---|
| 7,830,149 B1* | 11/2010 | Olsson | G01S 7/03 |
| | | | 324/326 |
| 7,983,685 B2 | 7/2011 | Silverstrim et al. | |
| 8,184,983 B1 | 5/2012 | Ho et al. | |
| 8,310,238 B2 | 11/2012 | Baiden | |
| 2007/0131418 A1* | 6/2007 | Barrow | E21B 47/04 |
| | | | 166/255.1 |
| 2007/0151471 A1 | 7/2007 | Le Rosa et al. | |
| 2008/0266110 A1 | 10/2008 | Hayford et al. | |
| 2011/0035121 A1* | 2/2011 | Katrak | F16H 59/70 |
| | | | 701/51 |
| 2011/0260923 A1 | 10/2011 | Liao et al. | |
| 2012/0293322 A1* | 11/2012 | Ray | G16H 10/65 |
| | | | 340/539.12 |
| 2013/0012229 A1 | 1/2013 | Itagaki et al. | |
| 2015/0285061 A1* | 10/2015 | Wu | E21B 47/024 |
| | | | 340/854.1 |

OTHER PUBLICATIONS

International Search Report dated Aug. 2, 2013 for corresponding International Patent Application No. PCT/AU2013/000629.
Office Action dated Jun. 13, 2016, for corresponding U.S. Appl. No. 14/406,485, filed Dec. 8, 2014.
Final Office Action dated Jan. 25, 2017, for corresponding U.S. Appl. No. 14/406,485, filed Dec. 8, 2014.
Office Action dated Feb. 1, 2018, for corresponding U.S. Appl. No. 14/406,485, filed Dec. 8, 2014.
Notice of Non-Compliant Amendment dated Sep. 5, 2018 for corresponding U.S. Appl. No. 14/406,485, filed Dec. 8, 2014.
Written Opinion of the International Searching Authority dated Aug. 2, 2013 for corresponding International Patent Application No. PCT/AU2013/000629.

* cited by examiner

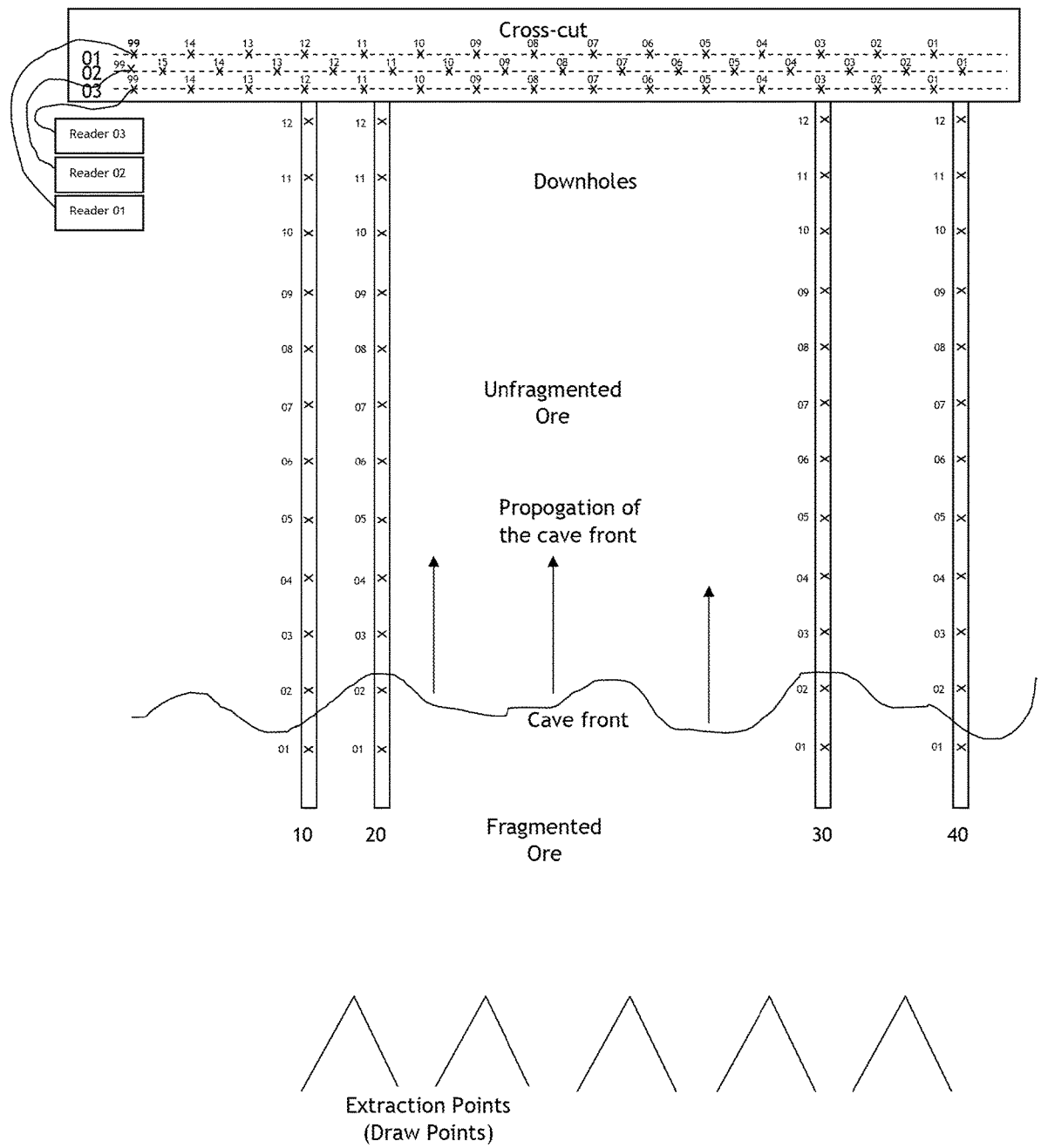

METHODS, SYSTEMS AND DEVICES FOR MONITORING MOVEMENT OF ROCK IN A MINE

CROSS REFERENCE TO RELATED APPLICATIONS

This Application is a Divisional Application of U.S. patent application Ser. No. 14/406,485, filed Dec. 8, 2014, which is a Section 371 National Stage Application of International Application No. PCT/AU2013/000629, filed Jun. 13, 2013, and claims the benefit of Australian provisional patent application Serial No. 2012902390, filed Jun. 7, 2012, the contents of which are hereby incorporated by reference in their entireties.

FIELD OF THE INVENTION

The present invention relates to the mining arts. In particular, the invention relates to methods for monitoring the movement of rock in a mine.

BACKGROUND TO THE INVENTION

In a mine, there is typically a volume of material having a higher concentration (ore grade) of the desired mineral, than the surrounding material. The material with higher grade mineral is generally termed the "ore body", and the material around the ore body is generally termed "host material".

Underground mining operations are designed to extract as much of the ore body, and as little as possible of the host material. One of the effects of inefficient mining is dilution, whereby the mixing of host material together with ore from the ore body reduces the overall ore grade.

Dilution has a significant detrimental effect on the economics of a mining operation. If the mining operation extracts and processes a tonne of host material the costs involved are the same as for targeted ore, however the mine does not receive the revenue that would have been in extracted material. Therefore profits are reduced by the value of the ore that was expected, but not received. While underground cave-type mines (Sublevel Caves and Block Caves) typically involve a low cost per tonne of material extracted; they suffer from high rates of dilution.

In the mining arts problems of dilution have been investigated and addressed by the use of various marker devices. The markers are typically used to measure ore flow in mass mines. These flow measurements are often performed with metallic markers having identification codes inscribed thereon. Being metallic, these markers may be conveniently retrieved by magnetic separation means already existing in the mining process.

More recently, radio frequency identification (RFID) technologies have been used to uniquely identify markers. Such markers may be read by one or more detector devices disposed about the mine.

Typically, ore movement measurements commence with the installation of a series of markers into various positions of the mine, or into mined material. The identification codes and installation locations are recorded. At one or more points in the extraction process, the markers are retrieved (or read in the case of RFID markers) and the codes recorded along with other data such as time of retrieval.

The installation position and retrieval details of a set of markers provide valuable ore flow information to mine management. By knowing the original installation position of each marker, along with the time and location of extraction, the movement of rock in an underground ore body can be analysed, revealing flow over time.

The measurement of ore movement is often required in open-pit mining. With open pit mining, the miner has the opportunity to choose where to send extracted material. Material believed to be ore is sent to the mill; whereas material believed to be waste is sent to a waste heap. The ore is usually sampled before blasting, and the boundary between targeted ore and waste is mapped. However, the process of blasting moves the material, and the ore-to-waste boundary moves. It is desirable for mining management to measurement ore movement, to reduce lost ore and the processing of ore diluted by waste.

Ore movement measurements are labour intensive because mine staff must manually recover the markers. Prior art techniques also lack precision and resolution.

A problem with these techniques using markers is that the collection of data occurs at the time the ore is extracted. This can lead to misinformation, or information that is provided when it is too late to make any adjustments to the mining process.

Measurement of rock movements is required in other contexts, such as in underground cave-type mines. It is often important to measure the upward propagation of the cave as it develops. As ore is being extracted from deep under the ground, the material above the extraction needs to "cave" and fall in to replace the extracted material. With "block cave" mining, the cave gradually propagates upwards to the surface, and eventually a crater forms on the surface. If, for whatever reason, the cave stops propagating, a cavity will form between the ore that has broken and fallen and the ore that is still in place. If the mining operation continues, this cavity will gradually grow in size as material is extracted from below. Eventually, the ceiling of this cavity will collapse. If the cavity was large before the collapse, an "air rush" can occur, because the highly pressurised air must escape through some means. If the air finds its way into a mine drive, it can have fatal consequences. The effect is similar to a blast. It is therefore important to measure the cave's propagation.

Current technology to measure cave propagation involves "time domain reflectometry" (TDR). Typically, holes are drilled from either the surface or from a tunnel through the ore body. These holes are populated with cables and associated electronic equipment, and a signal is transmitted along the cables. The signal reflects off the terminus of the cable, with the length of time taken for the signal to travel from the source to the terminus of the cable and back to a detector is measured. As the cave propagates, the end of the cable breaks off and therefore becomes shorter, thereby resulting in a shorter reflection time. A common problem with this approach is seen where the ground above the cave-front splits and, the two parts move relative to each other. This movement often cuts the cable at points higher than the cave front, resulting in incorrect data being provided.

It is an aspect of the present invention to overcome a problem of the prior art by providing improved methods, systems and markers for use in mining. It is a further aspect of the present invention to provide an alternative to the methods, systems and markers of the prior art.

The discussion of documents, acts, materials, devices, articles and the like is included in this specification solely for the purpose of providing a context for the present invention. It is not suggested or represented that any or all of these matters formed part of the prior art base or were common general knowledge in the field relevant to the present invention as it existed before the priority date of each claim of this application.

SUMMARY OF THE INVENTION

Throughout the description and the claims of this specification the word "comprise" and variations of the word, such as "comprising" and "comprises" is not intended to exclude other additives, components, integers or steps.

Reference throughout this specification to "one embodiment" or "an embodiment" means that a particular feature, structure or characteristic described in connection with the embodiment is included in at least one embodiment of the present invention. Thus, appearances of the phrases "in one embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

In a first aspect, the present invention provides a method for monitoring the movement of a first rock region in a mine relative to a second rock region in the mine, the method comprising the steps of:
providing a first marker device and a second marker device,
  the first marker device adapted to emit an electromagnetic signal,
  the second marker device adapted to (i) detect the strength of the electromagnetic signal emitted by the first marker device, and (ii) wirelessly transmit information related to the detected electromagnetic signal directly or indirectly to a reader device,
installing the first marker device in the first rock region,
installing the second marker device in the second rock region, and
monitoring the information on the detected electromagnetic signal on the reader device,
wherein, in use, movement of the first rock region relative to the second rock region is indicated where the second marker device detects a decrease in the strength of the electromagnetic signal emitted by the first marker device.

In another aspect, there is provided a method for identifying a distance between a first rock region in a mine and a second rock region in the mine, or the relative position of a first rock region in a mine to a second rock region in the mine, the method comprising the steps of:
providing a first marker device and a second marker device,
  the first marker device adapted to emit an electromagnetic signal,
  the second marker device adapted to (i) detect the strength or direction of the electromagnetic signal emitted by the first marker device, and (ii) wirelessly transmit information related to the detected electromagnetic signal directly or indirectly to a reader device,
installing the first marker device in the first rock region,
installing the second marker device in the second rock region, and
monitoring the information on the detected electromagnetic signal on the reader device,
wherein, in use, the distance between the first rock region and the second rock region, or the relative position of the first rock region to the second rock region, is determined by reference to the electromagnetic signal strength or direction emitted by the first marker device as detected by the second marker device.

The present invention provides one or more advantages over methods, systems and devices of the prior art. In particular, some embodiments of the method provide for accurate (or at least more accurate) real time information on ore position and/or flow in a mining setting.

To further explain the operation of the method, the electromagnetic signal emitted by the first marker device radiates toward the second marker device which is adapted to receive the signal. Any increase or decrease in the level of the signal, or the simple disappearance of the signal, or a change in direction of the signal indicates that the two markers have moved relative to each other. It may therefore be reasonably inferred that the regions of rock surrounding the two marker devices have moved relative to each other. This information may be informative about the location and/or the changes in location of the two markers with respect to each other.

The skilled person understands that absolute distance (or an approximation thereof) between two marker devices may be determined by reference to the electromagnetic signal strength. It is commonly known that signal strength decreases with distance according to the relationship $d \propto 1/r^3$.

Where a non-isotropic antenna is used in the marker devices, a change in signal strength may only indicate relative movement between two markers. However, where antennae which are closer to isotropic are used, the signal strength may be determinative of relative position.

Knowledge of the distances between marker devices, and the relative positions of each marker device in relation to others may allow the construction of detailed three-dimensional maps of the markers. When this information is also provided in real time (as provided by the present invention) mining operations can be significantly improved.

As used herein, the term "rock region" includes an area of rock surrounding the marker device. The term is intended to include solid rock, in which case the marker device is typically installed via a pre-drilled downhole. The term also includes fragmented rock of the type produced by a mining process (such as blasting) in which case the marker is placed onto or into a pile of fragmented rock.

Considering an application of the present methods in measuring the propagation of a cave front in a cave-type mine, the first marker device is installed within a rock region which is deep, and proximal to the advancing cave front, while the second marker device is installed in a rock region which is more shallow, and distal to the advancing cave front. Before any mining activity, the electromagnetic signal emitted by the first marker device is received by the second marker device. The inference is that the two markers have not been physically separated, and so the cave front is inferred to be deeper than the first marker.

When rock surrounding the first marker device is removed by the caving process in a block cave (for example), that region of rock drops toward the floor of the mine. The now greater distance between the first and second marker devices causes a decrease in the level of the electromagnetic signal received by the second marker device. This decrease in signal indicates that the blasted rock has (as is desired) fallen to the mine floor. Where no decrease in signal is observed after caving, this indicates that the cave front has not yet propagated to the rock surrounding the first marker, or that it has propagated but that the material has not fallen to the mine floor.

It will be appreciated that where a plurality of substantially vertically disposed markers are used, and the depth of each marker is known, it will be possible to infer the position of the cave front. For example, where marker devices are installed at sequential depths of 100, 105, 110, 115, and 120 meters before any mining begins all markers will receive an electromagnetic signal from a neighbouring marker (typically the marker disposed below) at a strength arbitrarily defined as 100%. Once blasting begins, the marker at the 120 meter level is the first to fall away while the marker at the 115 meter level remains lodged in the rock above. The marker at the 115 meter level detects that the strength of the electromagnetic signal emitted by the marker at the 120 meter level has decreased to 5% and transmits that information to the reader device.

Information on the decrease in signal strength (as detected by the second marker) is transmitted by the second marker via wireless means to a reader device. The reader device may be an electronic device adapted to interpret the information from the second marker device, or may simply relay the information to another electronic device (such as a computer) for interpretation. Alternatively, the reader device may be a computer capable of receiving and interpreting the information. The reader device include means for receiving the wireless signal from one or more marker devices (either directly or indirectly), such as an antenna. The reader's antenna may be of the same type as that of the markers, but may also have a different form factor.

As discussed in the embodiment supra, the present invention may comprise the use of multiple marker devices. Accordingly, in another aspect the present invention provides a method for monitoring the movement of a first rock region in a mine relative to a second rock region in the mine, the method comprising the steps of:

providing a plurality of marker devices, with most or all of the marker devices adapted to (i) emit an electromagnetic signal and (ii) detect the strength of the electromagnetic signal emitted by a neighbouring marker device, and (iii) wirelessly transmit information related to the detected electromagnetic signal directly or indirectly to a reader device, installing the marker devices in separate regions of rock, and monitoring the information on the detected electromagnetic signal on the reader device, wherein, in use, movement of one of the plurality of marker devices relative to a neighbouring marker device is indicated where the neighbouring marker device detects a decrease in the strength of the electromagnetic signal emitted by the one marker device.

In another embodiment there is provided a method for identifying a distance between a first rock region in a mine and a second rock region in the mine, or the relative position of a first rock region in a mine to a second rock region in the mine, the method comprising the steps of:

providing a plurality of marker devices, with most or all of the marker devices adapted to (i) emit an electromagnetic signal and (ii) detect the strength or direction of the electromagnetic signal emitted by a neighbouring marker device, and (iii) wirelessly transmit information related to the detected electromagnetic signal directly or indirectly to a reader device, installing the marker devices in separate regions of rock, and monitoring the information on the detected electromagnetic signal on the reader device, wherein, in use, the distance between the first rock region and the second rock region, or the relative position of the first rock region to the second rock region, is determined by reference to the electromagnetic signal strength or direction emitted by one of the plurality of marker devices as detected by a neighbouring marker device.

As mentioned in the Background section herein, in an underground mining operation the challenge is to understand and measure material flow and its effects on the cave. Measuring ore flow requires a reasonably high number of data points. Having more data points increases the resolution of data, which makes the data more useful. This is because material flow tends to be quite localised. Rocks tend to hang and other rocks tend to flow past them.

The use of a plurality of marker devices leads to a problem in some applications. Specifically, the distance between a marker and the reader device (or at least receiving antenna of the reader device) may become too great for reliable transmission of the information. Applicant proposes that this problem may be overcome or ameliorated by the implementation of the marker devices as means for relaying the information. Such networks are often referred to as a "mesh network". As is understood by the skilled person mesh networking is a type of networking where each node must not only capture and disseminate its own data, but also serve as a relay for other nodes, that is, it must collaborate to propagate the data in the network. In the context of the present invention, each marker device disseminates electromagnetic signal strength information, and also acts as a node itself to relay signal strength information disseminated by other markers, the network being configured to carry signal strength information to the reader device.

A mesh network can be designed using a flooding technique or a routing technique. When using a routing technique, the message propagates along a path, by hopping from node to node until the destination is reached. To ensure all its paths' availability, a routing network must allow for continuous connections and reconfiguration around broken or blocked paths, using self-healing algorithms. A mesh network whose nodes are all connected to each other is a fully connected network. Mesh networks can be seen as one type of ad hoc network.

The self-healing capability enables a routing based network to operate when one node breaks down or a connection goes bad. As a result, the network is typically reliable, as there is often more than one path between a source and a destination in the network.

Accordingly, in one embodiment of the method the marker device(s) (the first marker device, the second marker device, or any one or all of the plurality of marker devices) is adapted to relay information related to the detected electromagnetic signal. Stated another way the marker devices are adapted to transmit the information by a mesh networking protocol. In this embodiment, the marker devices form a network, whereby the information related to the detected electromagnetic signal is passed from one marker device to another marker device, to yet another marker device and so on, before arriving at the reader device. Thus, a single marker device has the three functions of emitting an electromagnetic signal, detecting an electromagnetic signal and relaying information related to an electromagnetic signal detected by another marker device.

In one embodiment, where the information related to the detected electromagnetic signal is transmitted indirectly to the reader device, the transmission is via a neighbouring marker device. In certain embodiments, the transmission of information is via 2, 3, 4 or a plurality of neighbouring marker devices. The number of marker devices via which the information transmitted to the reader device may be equal to or greater than about 2, 3, 4, 5, 6, 7, 8, 9, 10, 11, 12, 13, 14, 15, 16, 17, 18, 19, 20, 30, 40 or 50 marker devices.

The mesh network-based embodiments of the present methods provide significant advantages. One advantage is that the monitoring of relative rock movements over extended distances is possible. The underground transmission of radio frequency signals, for example, is significantly hampered by solid rock. The ability to relay information from one marker device to another provides the ability to monitor rock movements in a very deep body of ore. In some embodiments, the depth of the ore body capable of being monitored by the present methods is greater than or equal to about 100, 200, 300, 400, 500, 600, 700, 800, 900, 1000, 1100, 1200, 1300, 1400, 1500, 1600, 1700, 1800, 1900, 2000, 2100, 2200, 2300, 2400, 2500, 2600, 2700, 2800, 2900 or 3000 meters.

The electromagnetic signal may be simple electromagnetic energy, or it may encode data and/or information. Suitable types of electromagnetic signal include those operable across a required distance, and through the one or more media that would be encountered in use (such as solid rock and/or fragmented rock). In one embodiment, the electromagnetic signal has a frequency lower than that of microwave radiation.

In one embodiment the electromagnetic signal is a radio wave signal. The use of radio waves in a simple signal is all that is required for the purposes of determining whether one marker device has moved relative to another. It is not required that the radio wave signal encodes any information.

In another embodiment the wireless transmission is by radio wave, this type of transmission being capable of encoding information, and therefore more complex than a simple signal.

In yet a further embodiment the electromagnetic signal and the wireless transmission are both radio waves.

The use of radio waves as the electromagnetic signal is advantageous because it also allows for radio frequency (RF) transmission of information between markers. Thus, in this embodiment, the emission of RF from a marker device acts as both (i) the electromagnetic signal (the strength of which is used as an indicator of distance between markers), and (ii) means for wirelessly transmitting information between markers.

By implementing antennas that are either isotropic (i.e. radiate at the same signal strength in each direction), or multi-axis (3 identical antennas at orthogonal angles), the RF signal strengths can be used to measure distance. Each set of RF signal strengths allows the relative distance of each pair of markers to be calculated. When this information is collected for many pairs of markers, and for the Reader-Marker pairs, the real-time position of all markers can be calculated.

The absolute positioning error of markers will increase as more hops are required from the reader device to the marker whose position is being determined. However, this error can be reduced with multiple communication paths, or if the network spans from one (set of) reader devices (which are in known positions) to another (set of) reader devices in another area of the mine.

Note that the system is useful even if accurate positioning cannot be measured. For example, if the markers have non-isotropic antennas (i.e. the field strength varies in different directions), it will still be possible to have communications hop from marker to marker. It will also still be possible to detect movement of markers, because the signal strength between markers will change—even though the exact change may not be accurately measured.

The selection of frequency may be by consideration of the following factors. Through-the-ground RF communications need be of low enough frequency to penetrate the ground with low attenuation. However, in order to achieve a reasonable data rate (in order to transfer reasonable amounts of data without overly expending energy in the marker device battery), the frequency should not be too low. Thus, a compromise in choice of frequency is presented: a low frequency penetrates better through rock but has low data rates and large antenna needs, whereas a high frequency has poor penetration through rock but higher data rates.

In one embodiment, the frequency is selected from the range of about 1 Hz to about 1 GHz. In another embodiment the frequency is selected from the range of about 10 Hz to about 100 MHz. In yet a further embodiment the frequency is selected from the range of about 10 Hz to about 30 MHz. Preferred frequencies are 13.56 MHz and 125 to 134.2 kHz (often referred in the art to "128 kHz")

In one embodiment, the information is transmitted by a mesh networking protocol. An advantage of the present invention is the ability to measure and communicate (through the chain of markers in a mesh network) the RF field strengths between markers. This information informs a user of the system about the location and the changes in location of markers with respect to each other.

The skilled person is familiar with a range of protocols including for routing packets across mesh networks, including, examples including AODV (Ad hoc On-Demand Distance Vector), B.A.T.M.A.N. (Better Approach To Mobile Adhoc Networking), Babel (protocol) (a distance-vector routing protocol for IPv6 and IPv4 with fast convergence properties), DNVR (Dynamic Nix-Vector Routing), DSDV (Destination-Sequenced Distance-Vector Routing), DSR (Dynamic Source Routing), HSLS (Hazy-Sighted Link State), HWMP (Hybrid Wireless Mesh Protocol), IWMP (Infrastructure Wireless Mesh Protocol) for Infrastructure Mesh Networks by GRECO UFPB-Brazil, MRP (Wireless mesh networks routing protocol) by Jangeun Jun and Mihail L. Sichitiu, OLSR (Optimized Link State Routing protocol), OORP (OrderOne Routing Protocol) (OrderOne Networks Routing Protocol), OSPF (Open Shortest Path First Routing), PWRP (Predictive Wireless Routing Protocol), TORA (Temporally-Ordered Routing Algorithm), and IEEE™802.15.4 (ZigBee) IEEE 802.15.4. Such protocols may be used as a basis for a protocol workable within the context of the present methods, with the skilled person being enabled to do so. For completeness only, the following suggested protocol parameters are provided.

In the protocol, the data packet may comprise one or more of the following items of information:
 a. Preamble,
 b. Flags to define the type of data packet,
 c. A variable to influence the number of markers that are skipped when rippling communications along each Subnet,
 d. Size of data packet,
 e. Origin address: Subnet and Marker,
 f. Destination address: Subnet and Marker,
 g. Node Route from Origin address to Destination (see below for more information),
 h. Payload,
 i. Cyclic Redundancy Check (CRC) of data packet,
 j. Footer The Node Route may contain the following information for each transition between neighbouring subnets that the packet requires to pass through to get from the originating subnet to the destination subnet:

Direction of communications along first Subnet (ie upstream or downstream along the subnet),
Linking Node in first Subnet (Subnet and Marker), and
Linking Node in second Subnet (Subnet and Marker).

If the communications need to pass from subnet to subnet N times in order to get to the destination subnet, the Node Route will contain N sets of the above information.

Typically, all communications are commenced and controlled by the reader device. The system includes the following commands, amongst others:

1. Ping (within a particular subnet, find out which is the furthest marker that can be contacted);
2. Neighbour discovery; and
3. Subnet Hibernate.

In some embodiments, the protocol is adapted to take account of issues specific to mining applications. For example, to preserve battery power in marker devices, the protocol may specify that packets do not necessarily pass through each and every marker along a subnet. The markers will generally be placed at intervals less than half the range of communication between two markers to ensure that failure of individual markers do not cause loss of a subnet. This also means that communications along a subnet can skip markers and therefore preserve the batteries in the skipped markers. The protocol may include a parameter that tells the marker whether to skip markers when relaying the packet of data, and how many markers to skip. This can be implemented in different ways: for example, a marker trying to relay a packet could request a short response from all markers in range, and choose to forward the message to (for example) the marker with the second (or third) strongest RF signal in the required direction along the subnet.

In one embodiment of the method, each of the plurality of marker devices is uniquely identifiable, with an identification code being included in a data packet. In addition, the method may further comprise the step of recording the installation position of each uniquely identifiable marker device. In this way, it is possible to construct a map of the relative positions of the marker devices, and derive important information on rock movements in the mine.

In a further aspect the present invention provides a marker comprising (i) means for emitting an electromagnetic signal, (ii) means for detecting the strength or direction of an electromagnetic signal emitted by a neighbouring marker device, and (ii) means for wirelessly transmitting information related to the detected electromagnetic signal to a neighbouring marker device.

Given that the present markers are used under challenging conditions, certain embodiments of the marker comprise a marker housing adapted to physically protect the electronics contained therein from a mining activity. As used herein, the term "mining activity" is intended to include any activity capable of causing temporary or permanent damage to the electronics of the marker. Relevant mining activities include blasting, drilling, hammering, digging, and the like. In one embodiment, the housing is adapted to physically protect the electronics from blasting, and in certain embodiments the stress waves associated with that activity.

In one embodiment, the housing is adapted to pass radio waves with minimal attenuation. As will be appreciated by the skilled artisan, a balance may exist between the level of protection provided by a housing, and the (negative effect) of signal attenuation. The housing may attenuate the waves by less than about 90, 80, 70, 60, 50, 40, 30, 20, or 10%, however a housing having an attenuation of less than about 50% is preferred.

In one embodiment, the marker comprises a marker housing including at least two bordering material layers surrounding at least part of RF electronics housed within the marker housing, wherein there is a change in properties between adjacent layers so that shock waves are deflected around the RF electronics.

In another embodiment, the marker device comprises a housing including at least two bordering material layers surrounding at least part of RF electronics housed within the marker housing, wherein there is an impedance mismatch between any adjacent two of the at least two material layers.

In one embodiment, the marker housing has a casing of impact resistant plastics material. In one embodiment, the casing is of modified polyphenylene ether resin. In particular the casing may be of modified polyphenylene oxide and polyphenylene ether resin. More specifically, the casing may be a blend of polyphenylene oxide and polystyrene.

In another embodiment, the marker device comprises a marker housing comprising: a casing; and a core within which at least part of RF electronics is housed, the core being suspended within the casing. In one embodiment the at least part of RF electronics comprises a printed circuit board including electronic components.

In one embodiment, the core includes a resiliently deformable tube forming the outside of the core and the printed circuit board is housed within a bore of the tube.

In one embodiment, the space between the casing and the tube is filled with a first strengthening material having material properties which provide an impedance mismatch at the interface between the first strengthening material and one or both of the casing and the tube. By "impedance mismatch" it is meant a discontinuity in the mechanical and/or acoustic properties of adjacent materials to encourage a shock wave to pass around the interface instead of through it, and to inhibit cracks from propagating across the interface.

In one embodiment, the first strengthening material is a composite. More specifically the composite is a fibre-reinforced plastic and particularly a polymer matrix reinforced with fibreglass. In one embodiment, the core includes a second strengthening material which is located within the bore of the tube and abuts the inside of the tube.

In one embodiment, the second strengthening material is a composite. More specifically the composite is a fibre-reinforced plastic and particularly a polymer matrix reinforced with fibreglass.

In one embodiment, the core further includes a shock absorbing material attached to the printed circuit board. The shock absorbing material may be foam material.

In one embodiment the tube is of plastics material. In particular the tube may be of polyvinyl chloride material.

With further regard to suitable housings, reference is made to Applicant's international patent application published as WO/2011/035378 A1 the contents of which is herein incorporated by reference.

In another aspect the present invention provides a system comprising a plurality of marker devices wherein most or all of the marker devices are adapted to (i) emit an electromagnetic signal and (ii) detect the strength or direction of the electromagnetic signal emitted by a neighbouring marker device, and (iii) wirelessly transmit information related to the detected electromagnetic signal directly or indirectly to a reader device. In one embodiment, the system further comprises a reader device.

In one embodiment of the system most or all of the marker devices are adapted to transmit the information by a wireless mesh networking protocol.

In another embodiment the electromagnetic signal is a radio wave signal. In one embodiment the wireless transmission is by radio wave signal. In one embodiment the electromagnetic signal and the wireless transmission are both radio waves.

In one embodiment the radio wave has a frequency of between about 10 Hz to about 30 MHz.

In one embodiment of the system any one of the plurality of marker devices comprises a housing adapted to physically protect the electronics contained therein from a mining activity. In another embodiment the housing is adapted to pass radio waves.

In one embodiment the system is operable or is operated in a cave-type mine.

While the above predominantly describes applications for underground mining, the present invention also has applications in other types of mining. With open-pit mining, the miner has the opportunity to choose where to send extracted material. Material believed to be ore is sent to the mill; whereas material believed to be waste is sent to a waste heap. The ore is usually sampled before blasting, and the boundary between targeted ore and waste is mapped. However, the process of blasting moves the material, and the ore-to-waste boundary moves. The invention can be utilized to allow measurement of ore movement, to reduce lost ore and the processing of ore diluted by waste.

The present invention will now be more fully described by reference to the following non-limiting embodiment.

BRIEF DESCRIPTION OF THE DRAWING

FIG. 1 is a diagrammatic cross section a cave-type of underground mine.

DETAILED DESCRIPTION OF A PREFERRED EMBODIMENT OF THE INVENTION

Reference is made to FIG. 1 which shows in diagrammatic cross section a cave-type of underground mine. A series of holes are drilled into the ore body, into which markers are installed at regular depths. Each marker is able to send and receive information by RF.

Each marker is allocated a two-part identifying code, consisting of a "subnet" and a "Marker ID". The subnet is associated with the hole into which the string of markers is inserted. The Marker ID is a sequential number, such that the markers along the hole have gradually increasing Marker IDs. All communications are initiated from a reader device that is accessible and serviceable by mine staff. The reader device is capable of communicating with a certain number of markers within range.

In FIG. 1, a series of 4 vertically oriented drillholes is shown, with each having 12 marker devices disposed at regular intervals: marker 01 is the deepest, while marker 12 the most shallow.

Each set of 12 markers in a single downhole defines a subnet. Thus, subnet 10 comprises markers 1 to 12. Subnet 20 comprises a second group of markers 1, 2, 3 ... 12, and so on.

FIG. 1 also shows 3 horizontally disposed Subnets (01, 02 and 03), with each Subnet having a number of RF detectors (01, 02, 03 ...). Each Subnet 01, 02 and 03 relays information to a reader device (reader 01, reader 02, and reader 03) via node 99.

When ore is fragmented from the mine, the cave front propagates upwardly. In the process of fragmentation, the markers drop downwardly into the cave sequentially (marker 01 first, and marker 12 last).

As an example of a typical set of communications, the method of identifying the best nodes to link Subnet 03 to Subnet 20 is now presented.

To identify the best nodes to link to other Subnets, the system performs a "Neighbour Discovery" command on each marker in Subnet 03. A Neighbour Discovery command is focussed on the signal strengths between a specifically-addressed marker and all other markers within range of that marker. With the example scenario, the Neighbour Discovery command will therefore be repeated for each marker in Subnet 03. This data is collected and stored (in the Reader or in the computing equipment connected to the Reader) in order to decide on the routing for future communications.

The markers in range (as detected by a Neighbour Discovery command) could be in the same subset or in other subnets.

In order to communicate with another subnet, the system chooses a marker having strong communications with the other subnet. Take the example of the figure below. Suppose we want to communicate with markers in Subnet 20, from Subnet 03. Suppose that Subnet 03 markers 12, 11, 10 and 09 are all within range of markers from Subnet 20. Given their relative distances, suppose that Marker 11 has the strongest signal, when communicating with Subnet 20, Marker 12. Therefore, in future communications from Subnet 03 to 20, the routing information would be as follows:

Origin: Subnet 03, Marker 99
Node Route
Direction: Downstream
Link from: Subnet 03, Marker 11
Link to: Subnet 20, Marker 12

With this routing information, a Neighbour Discovery command can be issued to each marker in Subnet 20, via Subnet 03. This will provide the RF signal strength between for each pair of intercommunicating markers.

The figure below shows a scenario whereby the system is used to measure the position of the cave front. Subnets 01, 02 and 03 are along a tunnel through the ore. From this tunnel, various holes are drilled into the ore (Subnets 10, 20, 30 and 40). Eventually, as material is extracted from the bottom of the mine, the whole area will gradually collapse and sink down. Therefore, the tunnel will become unsafe for humans. That is why readers cannot be placed at the start of 600 subnets 10, 20, 30 and 40. Communications to these subnets need to be made via Subnets 01, 02 and 03.

The three subnets (01, 02 and 03) in the main tunnel are redundant for the following reasons:

(i) To save battery power. Two Subnets can be put to Hibernate, using the Hibernate command. The Hibernate command makes the commanded subnet Hibernate for the period of time specified in the Hibernate command (say, 1 week). For example, Subnets 01 and 02 may be commanded to Hibernate, and Subnet 03 would then be used to communicate. This preserves the batteries in Subnets 01 and 02. The load on the batteries can be managed by later communicating on, say, Subnet 01, and putting Subnets 02 and 03 to Hibernate.

(ii) Reliability. If, over time, markers fail (eg due to flat batteries), the remaining subnets can ensure that communications are still possible. Even if several markers have failed in all Subnets, the routing algorithm can allow communications to switch from Subnet to Subnet along its length.

By using a combination of Ping commands and Neighbour Discovery commands, we can regularly check on the mine's caving progress. As the mine caves, the lower markers will start to move away from the rest of the subnet. As they move, their RF signal strength (as measured by the Neighbour Discovery command) will change, and reduce.

Ping and Neighbour Discovery commands require a response from a particular marker. With a Ping command, the marker that must respond is the one that could not make contact with any markers further along the subnet, in the required direction. That marker constructs a packet of information and sends it back to the reader, using the same path as the outgoing command.

The communication technique and data packet structure is the same as for the command, but the route will be the opposite, and the type of packet is "Data" instead of a command.

It will be appreciated that in the description of exemplary embodiments of the invention, various features of the invention may be grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following this description are hereby expressly incorporated into this description, with each claim standing on its own as a separate embodiment of this invention.

Furthermore, while some embodiments described herein include some but not other features included in other embodiments, combinations of features of different embodiments are meant to be within the scope of the invention, and from different embodiments, would be understood by those in the art. For example, in the claims appended to this description, any of the claimed embodiments may be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

The invention claimed is:

1. A method for monitoring depth of a cave front in a cave-type mine, the method comprising acts of:
    providing a stationary reader device,
    providing a plurality of mobile marker devices, each of the plurality of marker devices adapted to (i) emit an electromagnetic signal, (ii) detect strength of the electromagnetic signal emitted by another of the plurality of mobile marker devices, and (iii) wirelessly transmit information related to the detected electromagnetic signal via another of the plurality of marker devices to the stationary reader device,
    drilling a downwardly orientated drill hole into a rock region of a mine,
    installing the plurality of mobile marker devices at sequential known depths within the drill hole,
    monitoring the reader device to detect a decrease in the strength of an electromagnetic signal emitted by a first of the plurality of mobile marker devices by a second of the plurality of mobile marker devices,
    in response to a decrease in the strength of an electromagnetic signal emitted by the first of the plurality of mobile marker devices being detected by the second of the plurality of mobile marker devices, inferring the depth of the cave front to be between the known depths of the first and second of the plurality of mobile marker devices.

2. The method of claim 1, wherein a decrease in strength of the electromagnetic signal is judged by comparing the strength of the electromagnetic signal before a caving process to the strength of the electromagnetic signal after the caving process.

3. The method of claim 2, wherein the caving process is blasting.

4. The method of claim 1, wherein the electromagnetic signal is a radio wave signal and/or the wireless transmission is by radio wave.

5. The method of claim 1, wherein the information is transmitted by a mesh networking protocol.

6. The method of claim 1, wherein each of the plurality of mobile marker devices comprises a housing adapted to physically protect the electronics contained therein from a mining activity.

7. The method of claim 6, wherein the mining activity is blasting, drilling, hammering, or digging.

8. The method of claim 1, wherein each of the marker devices is uniquely identifiable.

\* \* \* \* \*